March 23, 1948. F. D. BURNS 2,438,202
ADJUSTABLE CAM
Filed Dec. 22, 1943
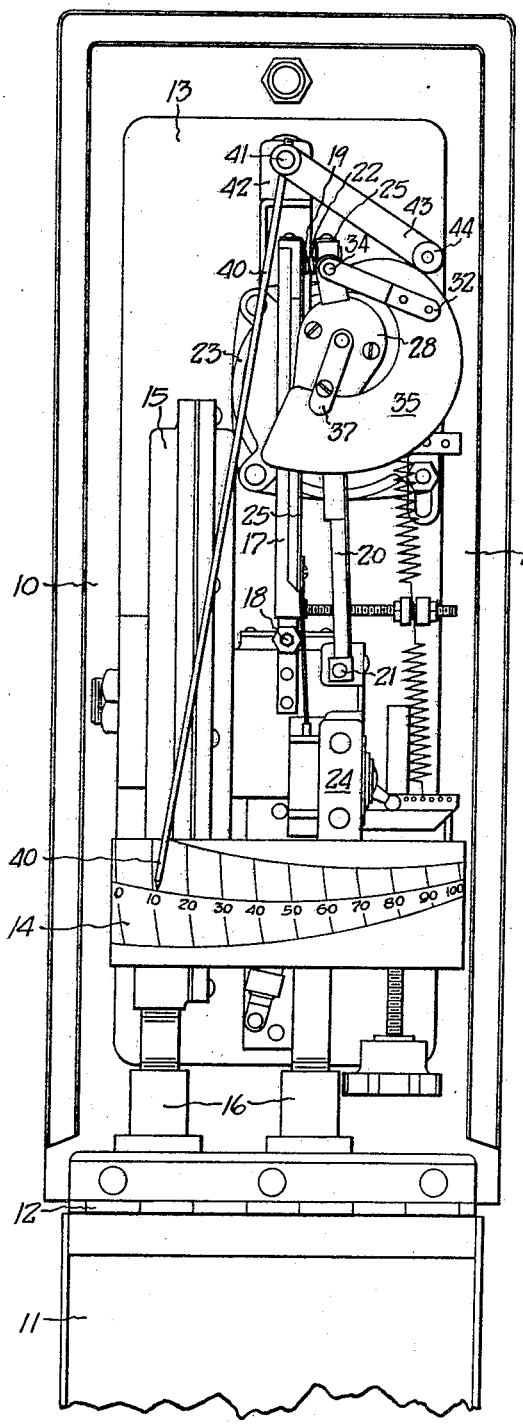
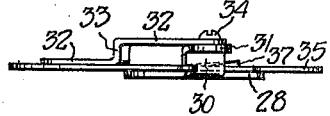
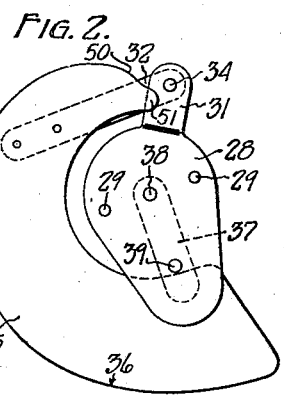
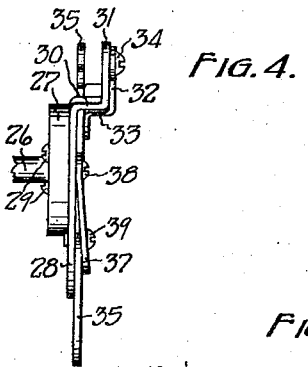
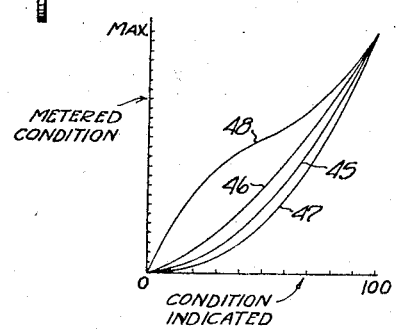
INVENTOR.
FRANK DONALD BURNS.
BY
Oltsch & Knoblock
attorneys.

Patented Mar. 23, 1948

2,438,202

UNITED STATES PATENT OFFICE 2,438,202

ADJUSTABLE CAM

Frank Donald Burns, Long Beach, Ind., assignor to The Hays Corporation, Michigan City, Ind., a corporation of Indiana Application December 22, 1943, Serial No. 515,207

5 Claims. (Cl. 74—568)

This invention relates to an adjustable cam.

It is frequently desirable, in instruments and other devices of various types, to provide cams which may be adjusted within limited ranges to compensate for conditions or characteristics differing somewhat from those for which the cam was designed and peculiar to the device or caused by factors inherent in the type or purpose of use, or in auxiliary or connected devices. An example of such an instrument is a flow meter which uses a square root cam to cause the indicating or recording means of the instrument to operate properly relative to a scale having substantially equally spaced scale divisions. In some instances the relation between flow and the condition which the instrument measures may not be a square root relation. Thus, if the air flow in a boiler is being measured, the characteristics of the metering element or motor of the instrument, or some condition in the boiler such as the arrangement of baffles therein, may cause a relationship which is below or above the square root relation. In such a case, the minimum and maximum values, for instance the zero and 100% values indicated by the instrument may remain accurate, but the intermediate values indicated by the instrument are inaccurate unless a cam designed to respond to the relationship which actually exists is used in the instrument.

Therefore, it is the primary object of this invention to provide a cam which is capable, by adjustment, of variation within predetermined limits of departure from the relation for which the cam element per se is shaped, while avoiding material change at either of the extremities of the cam element.

A further object is to provide a device of this character which is inexpensive, simple in construction, and which can be adjusted quickly and with minimum requirements for manipulation of parts.

Other objects will be apparent from the description and appended claims.

In the drawing:

Fig. 1 is a view in front elevation of an instrument using my new cam, wherein the cover plate of the instrument is shown in open position.

Fig. 2 is an enlarged view of the cam in rear elevation.

Fig. 3 is an enlarged top edge view of the cam.

Fig. 4 is an enlarged side edge view of the cam.

Fig. 5 is a diagram illustrating the operation of the cam at various adjustments thereof.

I have elected to illustrate the invention as applied to a gas flow meter of the type illustrated in Fig. 1, wherein the meter is provided with a casing or enclosure 10 having a cover or face plate 11 pivoted thereto at 12 and mounting a frame 13 therein for supporting the various operative elements or components of the instrument. Frame 13 also mounts a scale 14 positioned in registration with a sight opening (not shown) in face plate 11.

The instrument herein illustrated includes a suitable metering element 15, such as a device responsive to the difference in pressure existing at two different points in some device, such as a boiler, which pressures are tapped to the metering element 15 at conduit portions 16 thereof. The metering element 15 actuates an elongated arm 17 pivoted thereto at 18. Arm 18 carries a contact 19 at its outer end. A second elongated arm 20 is suitably pivoted to member 15 or to frame 13 at 21 about an axis parallel to the axis of pivot 18 and carries a contact 22 at its outer end and which is adapted to engage the contact 19.

A reversible electric motor 23, such as a three-lead capacitor type motor which has a condenser (not shown) so connected across the leads thereof as to control the phase relation of the field coils thereof, and therefore the direction of rotation thereof, according to whether one lead to the motor is open or closed, as is well understood in the art, is mounted on frame 13. Switch 24 controls the operation of the motor. One lead to the motor includes conductors 25 carried by arms 17 and 20 and connected to the contacts 19 and 22, whereby said contacts form a switch which controls the direction of operation of motor 23. The arm 20 is connected with the motor by suitable means (not shown) to be swung toward and from the arm 17 according to the direction in which the motor operates. The parts are so arranged that when the contacts 19 and 22 are in engagement the motor 23 will be controlled to operate in a direction to swing arm 20 to the right as viewed in Fig. 1, i. e., in a direction to disengage contact 22 from contact 19; and when the contacts 19 and 22 are out of engagement the motor operates to swing arm 20 to the left to cause engagement of contact 22 with contact 19. The position of arm 17 is controlled by the metering element 15, and hence the above described method of operation causes a continuous "hunting" operation of the motor of such character as to create a definite and predetermined relation between the rotative position of the motor shaft 26 (Fig. 4) and the position of arm 17.

The motor shaft 26 preferably mounts a disc 27 at its outer end concentric therewith. A carrier plate 28 is secured to this disc at 29 in face engagement therewith. Plate 28 is preferably flat and of substantially ovate form, with a portion thereof projecting laterally relative to disc 27. An ear is preferably formed integrally with plate 28 at the portion thereof opposite said above mentioned projecting portion, said ear preferably including a portion 30 bent substantially perpendicularly from the plate, and a terminal portion 31 bent outwardly from portion 30 and lying in a plane parallel to the plane of plate 28. An elongated arm 32, bent intermediate its ends to provide a substantially perpendicular off-setting portion 33 and to position the end portions thereof in spaced substantially parallel planes, is secured to the terminal portion 31 of the ear of plate 28 by means of screw 34 or the like, which serves as a pivot accommodating relative angular adjustment of the arm 32 on the carrier plate 28. A flat elongated curved cam plate 35 is fixedly secured at one end to the off-set outer end of arm 32 and lies in a plane parallel to and has face engagement with a portion of plate 28. As here shown, the cam plate is substantially C-shaped, and is comparatively narrow at the end portion secured to arm 32 and increases in width to terminate in a comparatively wide opposite free end portion. The outer edge of cam plate 35 constitutes the cam surface thereof, and a substantial or elongated portion of said edge at the wide free end portion of said plate is substantially concentric with the axis of screw 34. The outer edge of the cam plate at the pivoted end thereof is reversely curved at 50 adjacent to and facing the pivot axis 34 of said plate with its tip 51 spaced from the axis of shaft 26 a distance less than the spacing of the pivot member 34 from said axis. The concentric edge portion shown extends from approximately the point 36 to the outer end of the cam and is of a length approximately one-fourth of the total length of the cam edge. An elongated clamp plate 37 extends substantially longitudinally and centrally of plate 28 and is secured to plate 28 by screws 38 at one end and 39 at an intermediate portion thereof. The outer end of the clamp plate 37 bears against the face of cam plate 35 opposite that which bears against carrier plate 28, and serves to clamp said plate flat against said carrier plate.

An indicating pointer 40 is pivoted at 41 to a bracket 42 carried by frame 13, and an elongated arm 43 extends from said pivot and is held in fixed angular relation to pointer 40. A roller 44 is journaled on the outer end of arm 43 and rides upon the upper portion of the outer edge of the cam plate 35, whereby arm 43 serves as the means for operating pointer 40.

Assuming that the cam edge of the cam plate 35 is shaped to function as a square root extracting cam, i. e., in a parabolic curve, swinging of pointer 40 upon rotation of the cam will be according to a square root relation between the applied pressures or force and the condition to be indicated, so that the pointer will accurately indicate the condition being measured upon a scale whose divisions are substantially equally spaced as shown. The adjustability of the cam arrangement increases the usefulness of the instrument, however, and enables it to be used to measure conditions where the relation between the metered force, pressure or condition bears a relationship to the condition to be indicated somewhat different from a square root relation, such as a relationship between a 1.7 power and a 2.3 power, or within some other limited range of variation above and below the power for which the cam plate was designed. The cam plate 35 may be adjusted by releasing the clamping plate 37, swinging the cam plate about member 34 as a pivot to a position corresponding to the proper power or relation, and retightening the clamping plate. The zero point of the cam is not altered appreciably by the adjustment because of the location of the pivot 34, the provision of the reversely curved cam edge 50 and the small or minute movement of the pivoted end of the cam plate, all of which cooperate to permit the roller 44 to assume the same zero position in adjustments of the cam within its limited range proportional to the spacing of point 36 from the opposite end of the cam. The 100% point of the cam is not altered appreciably by the adjustment because of the concentric relation with pivot 34 of the elongated portion of the edge of the cam at the free end portion of the cam. Consequently the adjusted settings of the cam will produce results as illustrated graphically in Fig. 5 where the curve 45 represents operation of the cam as a square root cam, the curve 46 represents operation with the cam adjusted for a relation fractionally less than the square root, and the curve 47 represents operation with the cam adjusted for a relation fractionally greater than the square root. In the graph it is assumed that the range of the condition being measured by the instrument is the same for all cam adjustments, i. e. that the maximum measurement which can be or which is desired to be made by the metering element remains constant.

While the device has been described with respect to square root relations, it is also applicable to cube root relations and variations therefrom, or to relations varying with respect to any other mathematical power. Still another application of the invention is to permit cam adjustments to compensate for variations in other relations such as variations from a relation illustrated graphically at 48 in Fig. 5, for which special shapes of cam plate 35 must be designed.

I claim:

1. An adjustable cam comprising a carrier adapted to be mounted on a rotatable member, an ear projecting outwardly from and terminating in a portion off-set from said carrier, a flat cam plate of elongated curved outline, an arm projecting from one end of said cam plate and terminating in a portion off-set therefrom, means pivotally connecting the off-set terminal portions of said ear and arm, and releasable means for clamping the opposite end of said cam plate against said carrier.

2. An adjustable cam comprising a carrier, a flat cam plate having a cam edge of elongated curved outline including a reversely curved end portion, said plate bearing against said carrier at one end, means projecting from the side of said plate adjacent the reversely curved end of said plate for pivotally connecting said plate adjacent to its reversely curved end portion to said carrier about an axis spaced from the axis of said carrier whereby said reversely curved end of said cam edge bears a substantially constant relation to the axis of said carrier in all adjustments thereof within a predetermined range, a portion of the opposite end of said cam edge diametrically opposed to said pivot means being concentric with said pivot axis, and means for releasably securing the free end portion of said plate to said carrier, said range being proportional to the length of said concentric portion.

3. An adjustable cam as defined in claim 2, wherein said pivot means includes pivotally connected parts off-set relative to said carrier and to the end of said cam plate, respectively.

4. An adjustable cam comprising a carrier, a flat cam plate having an elongated curved cam edge including a reversely curved end portion, means pivoting one end of said plate eccentrically of said carrier and spaced outwardly from said reverse curved end portion whereby the reverse curved end of said cam edge maintains a substantially constant spacing from the axis of said carrier in a limited range, the opposite end portion of said cam edge terminating at least 180° displaced from said pivot means and including a portion concentric with said pivot means, and releasable means for locking said plate to said carrier in selected adjustment.

5. An adjustable cam comprising a carrier, a C-shaped flat plate having a C-shaped cam edge terminating in a reverse curve and adapted for engagement by a cam follower, means for pivoting said plate to said carrier eccentrically of said carrier and spaced from said reversely curved edge whereby the adjacent end of said C-shaped edge maintains a substantially constant relation to the axis of said carrier, and means for releasably clamping said plate to said carrier, an elongated portion of the opposite end of said cam edge being diametrically opposed to and substantially concentric with said pivot means, whereby angular adjustment of said plate upon its pivot varies the relation of said cam edge and cam follower to the axis of said carrier on radii between but not at the diametrically opposed points of engagement of the cam edge and cam follower at which the latter is aligned with the carrier axis and the pivot axis when the concentric edge is diametrically opposed to said plate pivot.

FRANK DONALD BURNS.

REFERENCES CITED

The following references are of record in the file of this patent:

UNITED STATES PATENTS

| Number | Name | Date |
|---|---|---|
| 359,133 | Covel | Mar. 8, 1887 |
| 868,086 | Hanson et al. | Oct. 15, 1907 |
| 1,083,991 | Connet | Jan. 13, 1914 |
| 1,202,052 | Gibson | Oct. 24, 1916 |
| 1,795,250 | Connet | Mar. 3, 1931 |
| 1,880,933 | Elliott | Oct. 4, 1932 |

FOREIGN PATENTS

| Number | Country | Date |
|---|---|---|
| 571,890 | Germany | Mar. 7, 1933 |